(12) United States Patent
Oyama

(10) Patent No.: US 6,832,638 B2
(45) Date of Patent: Dec. 21, 2004

(54) PNEUMATIC TIRE WITH SIDEWALL HAVING CONCAVE PORTION ADJACENT CONVEX MARK OR CONVEX PORTION ADJACENT CONCAVE MARK

(75) Inventor: Toshiro Oyama, Hiratsuka (JP)

(73) Assignee: The Yokohama Rubber Co., Ltd., Tokyo (JP)

( * ) Notice: Subject to any disclaimer, the term of this patent is extended or adjusted under 35 U.S.C. 154(b) by 383 days.

(21) Appl. No.: 09/988,768

(22) Filed: Nov. 20, 2001

(65) Prior Publication Data

US 2002/0074071 A1 Jun. 20, 2002

(30) Foreign Application Priority Data

Oct. 27, 2000 (JP) ........................................ 2000-328750

(51) Int. Cl.⁷ ........................... B60C 13/02; B60C 13/04
(52) U.S. Cl. ....................................... 152/523; 152/524
(58) Field of Search ................................. 152/523, 524, 152/DIG. 12; D12/605

(56) References Cited

FOREIGN PATENT DOCUMENTS

| JP | 61081207 A | * | 4/1986 | ................. 152/523 |
| JP | 04218412 A | * | 8/1992 | ................. 152/523 |
| JP | 05-178013 A | * | 7/1993 | ................. 152/523 |

* cited by examiner

*Primary Examiner*—Adrienne C. Johnstone
(74) *Attorney, Agent, or Firm*—Rader, Fishman & Grauer PLLC

(57) ABSTRACT

A pneumatic tire, in which a concave portion adjacent to a convex mark is provided on a surface of a sidewall portion, and a ratio of a volume v of the concave portion to a volume V of the convex mark is set as: $0.8V \leq v \leq 1.2V$, alternatively, a convex portion adjacent to a concave mark is provided on the surface of the sidewall portion, and a ratio of a volume w of the convex portion to a volume W of the concave mark is set as: $0.8W \leq w \leq 1.2W$, thus suppressing a bend of a carcass layer located under a mark spot of the sidewall portion, and making it possible to maintain a carcass line approximately uniformly on a circumference thereof.

3 Claims, 3 Drawing Sheets

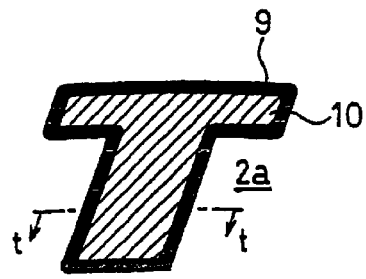
Fig. 5(a)
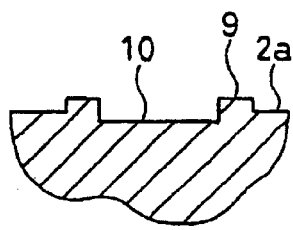
Fig. 5(b)
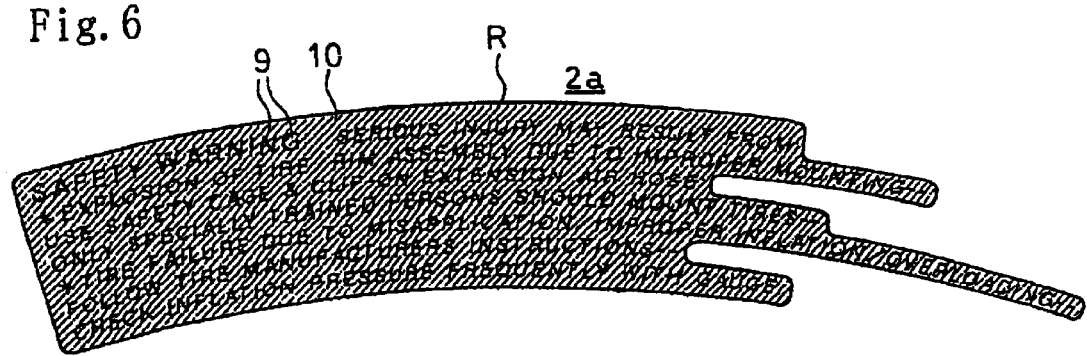
Fig. 6
Fig. 7  PRIOR ART
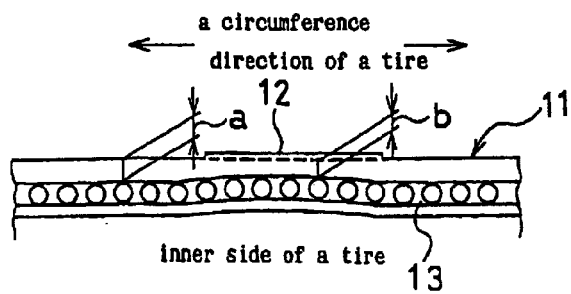

US 6,832,638 B2

PNEUMATIC TIRE WITH SIDEWALL HAVING CONCAVE PORTION ADJACENT CONVEX MARK OR CONVEX PORTION ADJACENT CONCAVE MARK

BACKGROUND OF THE INVENTION

1. Field of the Invention

The present invention relates to a pneumatic tire provided with a mark such as a letter, a numeral, a symbol and an emblem on a surface of a sidewall portion, more specifically to a pneumatic tire adapted to suppress a bend of a carcass layer, which is caused by a bias of a rubber quantity on a spot of the mark.

2. Description of the Related Art

On the surface of the sidewall portion of a pneumatic tire, provided are a letter, a numeral and a symbol that represent a manufacturer name, a tire type and the like and a mark such as an emblem representing a trademark. Generally, such a mark is formed convexly on the surface of the sidewall portion. And, a technique of enlarging the mark has been heretofore adopted for enhancing visibility (visuality) of the mark. However, when the mark is enlarged as described above, increased is a quantity of rubber flowing into a die concave portion for forming a mark, which is a part of planar rubber constituting the sidewall portion during tire vulcanization. Therefore, a thickness of the sidewall portion on the spot of the mark is thinned. Consequently, as shown in FIG. 7, in the vulcanized tire, there occurs a difference between a rubber thickness b of a sidewall portion 11 on a spot where a mark 12 is present and a rubber thickness a of the sidewall portion on a spot where the mark 12 is not present. In this case, the rubber thickness means a length from the surface of the sidewall portion 11 to a carcass layer 13. The difference described above causes a bend of the carcass layer 13 located under the mark 12 of the sidewall portion 11, leading to a problem that a carcass line cannot be uniformly maintained on a circumference thereof.

SUMMARY OF THE INVENTION

The object of the present invention is to provide a pneumatic tire capable of maintaining the carcass line approximately uniformly on the circumference thereof.

The present invention achieving the foregoing object is a pneumatic tire comprising: a carcass layer bridged between a pair of bead portions; and a convex mark provided on a surface of a sidewall portion, characterized in that a concave portion adjacent to the convex mark is provided on the surface of the sidewall portion, and a ratio of a volume v of the concave portion to a volume V of the convex mark is set as: $0.8V \leq v \leq 1.2V$.

Moreover, the present invention is a pneumatic tire comprising: a carcass layer bridged between a pair of bead portions; and a concave mark provided on a surface of a sidewall portion, characterized in that a convex portion adjacent to the concave mark is provided on the surface of the sidewall portion, and a ratio of a volume w of the convex portion to a volume W of the concave mark is set as: $0.8W \leq w \leq 1.2W$.

As described above, the concave portion is provided to be adjacent to the convex mark, and the volume ratio is regulated in the foregoing range. Therefore, even if the quantity of rubber flowing into the die concave portion for forming a mark during the tire vulcanization is increased, thinning of the thickness of the sidewall portion on the mark position as before can be avoided, and the thickness is not thickened too much because rubber having existed on the spot of the concave portion flows into a portion of the convex mark. Consequently, the bend of the carcass layer on the mark portion of the sidewall portion is suppressed, thus making it possible to maintain the carcass line approximately uniformly on the circumference thereof. The same can be applied to the case where the convex portion is provided to be adjacent to the concave mark.

BRIEF DESCRIPTION OF DRAWING

FIG. 2(a) is a front view; and

FIG. 2(b) is an enlarged sectional view taken along a line x—x of FIG. 2(a).

FIG. 3(a) is a front view; and

FIG. 3(b) is an enlarged sectional view taken along a line y—y of FIG. 3(a).

FIG. 4(a) is a front view; and

FIG. 4(b) is an enlarged sectional view taken along a line z—z of FIG. 4(a).

FIGS. 5(a) and 5(b) are views showing still another example of the concave portion adjacent to the convex mark for use in the pneumatic tire of the present invention:

FIG. 5(a) is a front view; and

FIG. 5(b) is an enlarged sectional view taken along a line t—t of FIG. 5(a).

FIG. 6 is a front view showing still another example of the concave portion adjacent to the convex mark for use in the pneumatic tire of the present invention.

FIG. 7 is a sectional view in a circumference direction of a tire, showing an extent of a bend of a carcass layer under a mark position of a sidewall portion.

DETAILED EXPLANATION OF THE PREFERRED EMBODIMENTS

Hereinafter, description will be made in detail for a constitution of the present invention with reference to the accompanying drawings.

Figure 1:
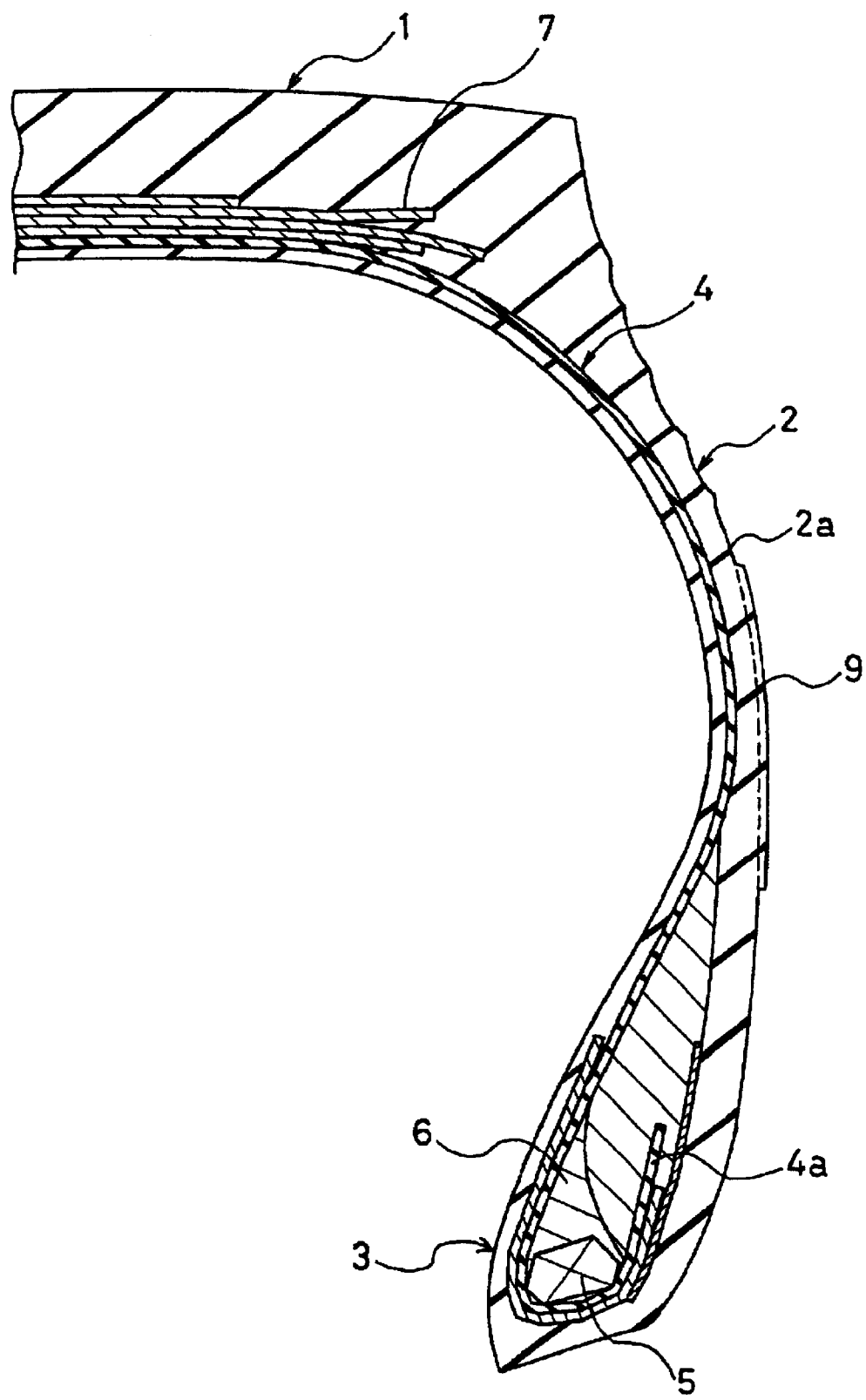
FIG. 1 is a semi-sectional view showing principal portions of one example of a pneumatic tire of the present invention in a meridian direction thereof.

FIG. 1 shows one example of a pneumatic tire of the present invention. A reference numeral 1 denotes a tread portion, a numeral 2 denotes a sidewall portion, and a numeral 3 denotes a bead portion. Within the tire, a carcass layer 4 is bridged between a pair of bead portions 3 and 3, and each end 4a thereof is folded and wound up from an inside of the tire to an outside thereof around a bead core 5 buried in the bead portion 3. On a surface of the bead core 5 to the outer circumference direction of the tire, a bead filler 6 is consecutively provided. On a surface of the carcass layer 4 to the outer circumference direction in the tread portion 1, a plurality of belt layers 7 are provided covering a circumference of the tire.

Figure 2A:
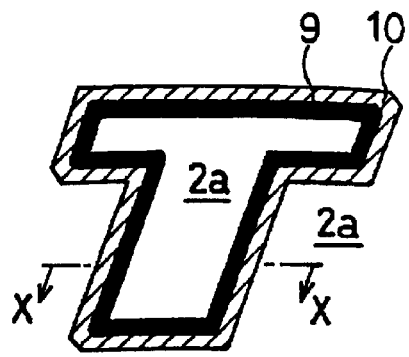
FIGS. 2(a) and 2(b) are views showing one example of a concave portion adjacent to a convex mark for use in the pneumatic tire of the present invention.
Figure 2B:
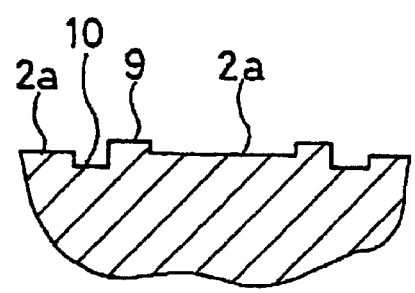

On a surface 2a of the sidewall portion 2, convexly provided are a letter, a numeral and a symbol that represent a manufacturer name, a tire type and the like and a mark 9 such as an emblem representing a trademark. On the surface 2a of the sidewall portion 2, which is adjacent to the convex mark 9, as shown in FIGS. 2(a) and 2(b), a concave portion 10 is provided along an outer periphery of the convex mark 9. A ratio of a volume v of the concave portion 10 to a volume V of the convex mark 9 is set as: $0.8V \leq v \leq 1.2V$.

The concave portion 10 is provided to be adjacent to the convex mark 9 so that the volume ratio can be regulated in the foregoing range in such a manner as described above. Thus, rubber having existed on a position of the concave portion 10 can be flown into a portion of the convex mark 9 during tire vulcanization. Therefore, a thickness of the sidewall portion 2 where the mark 9 is present is not thinned as before or thickened too much. Hence, the bend of the carcass layer 4 located under the mark 9 of the sidewall portion 2 is suppressed, thus making it possible to maintain the carcass line approximately uniformly on the circumference thereof.

If the volume v of the concave portion 10 is smaller than 0.8V, the thickness of the sidewall portion 2 under the position of the mark 9 is thinned, leading to difficulty in effectively suppressing the bend of the carcass layer 4. On the contrary, if the volume v is larger than 1.2V, the thickness of the sidewall portion 2 under the position of the mark 9 is thickened too much, also resulting in the difficulty in suppressing the bend of the carcass layer 4. It is preferable that the volume v be equal to the volume V.

Figure 3A:
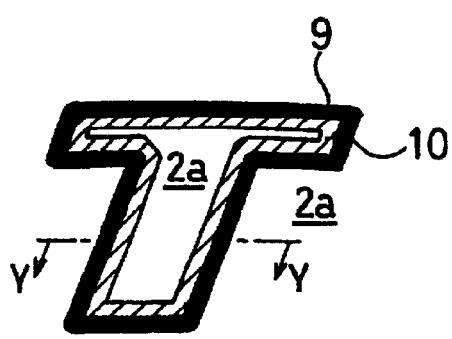
FIGS. 3(a) and 3(b) are views showing another example of the concave portion adjacent to the convex mark for use in the pneumatic tire of the present invention.
Figure 3B:
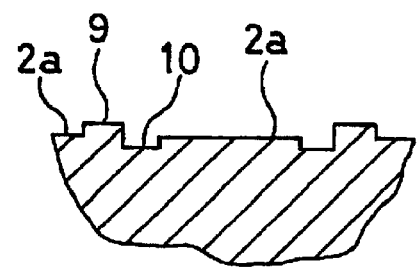
Figure 4A:
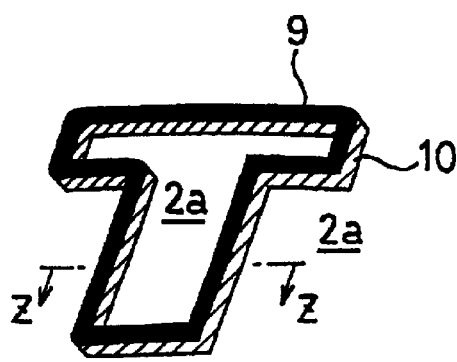
FIGS. 4(a) and 4(b) are views showing yet another example of the concave portion adjacent to the convex mark for use in the pneumatic tire of the present invention.
Figure 4B:
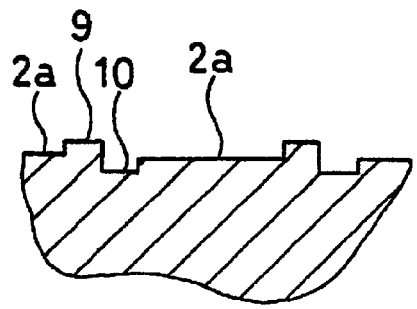

FIGS. 3(a) to 5(b) show other examples of the concave portion 10 adjacent to the convex mark 9. In FIGS. 3(a) and 3(b), the concave portion 10 is provided along the inner periphery of the convex mark 9. In FIGS. 4(a) and 4(b), the concave portion 10 is provided along the inner and outer peripheries of the convex mark 9 intermixedly. In FIGS. 5(a) and 5(b), the concave portion 10 is provided entirely on the inside of the convex mark 9. The concave portion 10 may be provided as described above.

FIG. 6 shows yet another example of the concave portion 10 adjacent to the convex mark 9, where the concave portion 10 is provided on the entire region R for a plurality of convex marks 9 spaced from one to another. This concave portion 10 can be preferably used in the case where the marks 9 such as letters having a size of 10 mm or smaller are arranged.

In this embodiment, the mark 9 is formed into a convex shape. Alternatively, in the present invention, the mark 9 may be formed into a concave shape, and a convex portion may be provided similarly to the above-described concave portion. In this case, a volume ratio of a volume w of the convex portion to a volume W of the concave mark is set as: $0.8W > w \leq 1.2W$.

Hereinafter, description will be made further for the present invention with reference to an example.

Tires 1 to 3 of the present invention and comparative tires 1 and 2, each having a constitution shown in FIG. 1, and a conventional tire without any concave portion were prepared, respectively. With regard to each of the tires 1 to 3 of the present invention and the comparative tires 1 and 2, the volume ratio of the volume v of the concave portion to the volume V of the convex mark was varied as shown in Table 1. With regard to the above-described six tires, a tire size was set commonly at 11R22.5.

Each of these tires was disassembled, and the extent of the bend of the carcass layer located under the mark spot of the sidewall portion was examined. Consequently, results shown in Table 1 were obtained.

Note that, in order to obtain the extent of the bend, measurement was made for the rubber thickness b of the sidewall portion on the spot where the mark is present and the rubber thickness a of the sidewall portion on the spot where the mark is not present (see FIG. 7), and a difference between b and a was set as the extent of the bend. The smaller an absolute value of the difference is, the smaller the extent of the bend is.

TABLE 1

|  | Conventional Tire | Comparative Tire 1 | Tire 1 of the Present Invention | Tire 2 of the Present Invention | Tire 3 of the Present Invention | Comparative Tire 2 |
|---|---|---|---|---|---|---|
| Volume v of Concave Portion | 0 | 0.6 V | 0.8 V | 1.0 V | 1.2 V | 1.4 V |
| Extent of Bend b-a (mm) | −0.7 | 0.5 | 0.2 | 0.0 | −0.2 | −0.5 |

As apparent from Table 1, in the tires of the present invention, the difference b-a is 0.2 mm or less, and the bend of the carcass layer located under the mark spot of the sidewall portion can be suppressed.

What is claimed is:

1. A pneumatic tire, comprising:
   a carcass layer bridged between a pair of bead portions; and
   a convex mark provided on a surface of a sidewall portion and having a shape resembling at least one of a letter, a numeral, a symbol and an emblem,
   wherein a concave portion adjacent to said convex mark is provided on the surface of said sidewall portion, and a ratio of a volume v of the concave portion to a volume V of said convex mark is set as: $0.8V \leq v \leq 1.2V$
   the concave portion adjoining one of an entire inner periphery of the convex mark, an entire outer periphery of the convex mark and partially the inner periphery and partially the outer periphery of the convex mark such that the concave portion resembles the shape of the convex mark.

2. A pneumatic tire, comprising:
   a carcass layer bridged between a pair of bead portions; and
   a concave mark provided on a surface of a sidewall portion and having a shape resembling at least one of a letter, a numeral, a symbol and an emblem,
   wherein a convex portion adjacent to said concave mark is provided on the surface of said sidewall portion, and a ratio of a volume w of the convex portion to a volume W of said concave mark is set as: $0.8W \leq w \leq 1.2W$,
   the convex portion adjoining one of an entire inner periphery of the concave mark, an entire outer periphery of the concave mark and partially the inner periphery and partially the outer periphery of the concave mark such that the convex portion resembles the shape of the concave mark.

3. A pneumatic tire having a sidewall portion defining a sidewall surface and formed with a carcass layer bridged between a pair of bead portions, the sidewall surface being provided with indicia, the indicia comprising:

a plurality of convex marks projecting outwardly from the sidewall surface to occupy a volume V above the sidewall surface, each one of the plurality of convex marks having a shape resembling at least one of a letter, a numeral, a symbol and an emblem; and a concave region extending into the sidewall portion thereby displacing a volume v of the sidewall portion and surrounding the plurality of convex marks, wherein a ratio of the volume v of the concave region to the volume V of said plurality of convex marks is set as: $0.8V \leq v \leq 1.2V$.

* * * * *